T. H. Squire.
Roof Shingles.
Nº 43,717.  Patented Aug. 2, 1864.
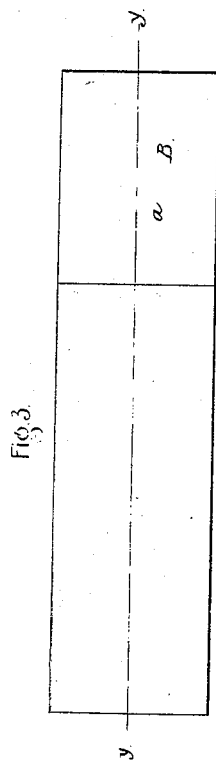
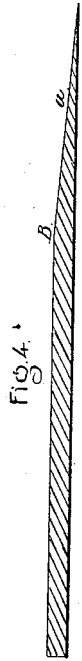
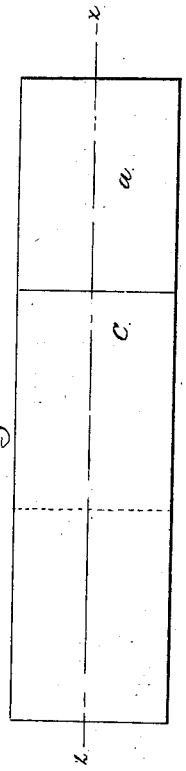
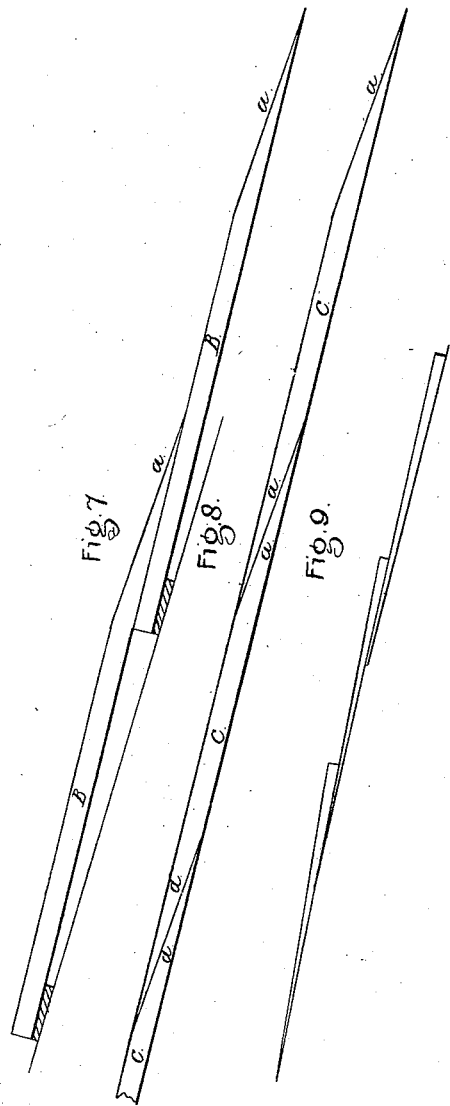
Attest:
Inventor:

UNITED STATES PATENT OFFICE.

T. H. SQUIRE, OF ELMIRA, NEW YORK.

IMPROVEMENT IN SHINGLES FOR ROOFING.

Specification forming part of Letters Patent No. 43,717, dated August 2, 1864.

*To all whom it may concern:*

Be it known that I, T. H. SQUIRE, of Elmira, in the county of Chemung and State of New York, have invented a new and useful Improvement in Shingles for Roofing Purposes; and I do hereby declare that the following is a full, clear, and exact description of the same, reference being had to the accompanying drawings, making a part of this specification, in which—

Figure 1 is a plan or face view of one form of my invention; Fig. 2, a longitudinal section of Fig. 1, taken in the line $x\,x$; Fig. 3, a plan or face view of a modification or another form of my invention; Fig. 4, a longitudinal section of Fig. 3, taken in the line $y\,y$; Fig. 5, a plan or face view of still another form of my invention; Fig. 6, a longitudinal section of Fig. 5, taken in the line $z\,z$; Figs. 7 and 8 side views of my invention, showing the manner in which they are laid in constructing the roof; Fig. 9, a side view of a portion of a roof formed of the ordinary shingles now used.

Similar letters of reference indicate corresponding parts in the several figures.

The ordinary shingles or those now in common use are constructed of wedge shape, being thickest at their butts and gradually tapering their whole length toward their opposite ends. The shingles are laid upon lath or roof boards and secured thereto by nails, and arranged in layers, one layer lapping over the other, so that the roof, when completed, forms a series of inclined planes, of greater or less length, according to the length of shingle exposed to the weather. Each shingle presents to the descending water passing over it two sides of a triangle, the perpendicular and the base, the perpendicular being the "weather-surface," technically so termed, and the base the butt of the shingle. In the case of shaved or rived shingles the grain of wood corresponds nearly with the direction of the length of shingle, which greatly facilitates the free passage of the water over it; but with sawed shingles the grain of the wood is most generally more or less oblique with the direction of the length of the shingle, which serves to retard the passage of the water over it, and causes the latter to have a sluggish movement, and, instead of falling directly off from the terminus of one inclined plane to the upper surface of the one immediately below it, passes down over the butts of the shingles across the grain of the wood, or endwise of the same. The water has thus every facility to penetrate the pores of the wood, inducing decay and favoring the growth of moss.

My invention consists in constructing the shingles of such a form that they may be laid with a uniform smooth exterior surface, so that the roof will be at each side or pitch one continuous inclined plane, or nearly so. To effect this result, I construct the shingles in either of two different forms—to wit, beveled or tapered at their weather or exposed end, or tapered at both ends. The first-mentioned form is shown in Figs. 3 and 4, B indicating the shingle, and the second in Figs. 5 and 6, C indicating the shingle, the tapered or beveled surfaces being indicated by $a$.

The manner of laying the shingles is shown in Figs. 7 and 8, and it will be seen by referring to those figures that the roof will have a smooth exterior, to admit of the ready escape of the water.

I design to have the shingles a uniform width throughout, and when double-tapered shingles are used the bevel of the weather-surface is formed by chamfering or sawing from the upper surface, the bevel at the opposite end being obtained by chamfering or sawing from the under side. (See Fig. 8.)

Having thus described my invention, what I claim as new, and desire to secure by Letters Patent, is—

The constructing of shingles for roofing purposes with one or both ends beveled or tapered, as herein shown and described.

T. H. SQUIRE.

Witnesses:
I. H. DANDY,
JOHN E. SHEPARD.